(12) United States Patent
Kricorissian et al.

(10) Patent No.: US 7,377,437 B2
(45) Date of Patent: *May 27, 2008

(54) TARGETING SYSTEM FOR A PORTABLE IMAGE READER

(75) Inventors: Gregg R. Kricorissian, Ottawa (CA); Xinjun Xie, Ottawa (CA)

(73) Assignee: Psion Teklogix Systems Inc., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/641,311

(22) Filed: Dec. 19, 2006

(65) Prior Publication Data

US 2007/0095918 A1 May 3, 2007

Related U.S. Application Data

(63) Continuation of application No. 11/033,093, filed on Jan. 10, 2005, now Pat. No. 7,163,150.

(51) Int. Cl.
*G06K 7/10* (2006.01)
(52) U.S. Cl. .............. 235/462.21; 235/454; 235/462.2; 235/272.01
(58) Field of Classification Search ............. 235/462.2, 235/462.21, 462.35
See application file for complete search history.

(56) References Cited

U.S. PATENT DOCUMENTS 5,811,784 A * 9/1998 Tausch et al. ......... 235/472.01
6,073,851 A 6/2000 Olmstead et al.
6,223,988 B1 5/2001 Batterman et al.
6,347,163 B2 2/2002 Roustaei
6,371,374 B1 4/2002 Schwartz et al.
6,385,352 B1 5/2002 Roustaei
6,547,139 B1 4/2003 Havens et al.
6,688,525 B1 2/2004 Nelson et al.
7,090,132 B2 8/2006 Havens et al.
2003/0019934 A1 1/2003 Hunter et al.

* cited by examiner

*Primary Examiner*—Seung Ho Lee
(74) *Attorney, Agent, or Firm*—Pearne & Gordon LLP

(57) ABSTRACT

A targeting system for a portable image reader, which advantageously combines a number of functions including alignment, aiming, framing and range finding and provides a wide imaging range with an optimal field of view, is described. The targeting system projects a predetermined pattern having two or more components onto the target such that the components maintain a uniform distance between one another to bound the target and further vary in size as a function of their distance between the image reader and the target. The targeting system comprises targeting LED's, apertures positioned over the targeting LED's, and cylindrical lenses positioned over the apertures. With this arrangement, at least two vertical lines are projected onto a target such that the lines maintain a uniform distance apart from one another, but vary in length as a function of the reader distance from the target. This allows the operator to quickly position the imaging device over a target.

20 Claims, 8 Drawing Sheets

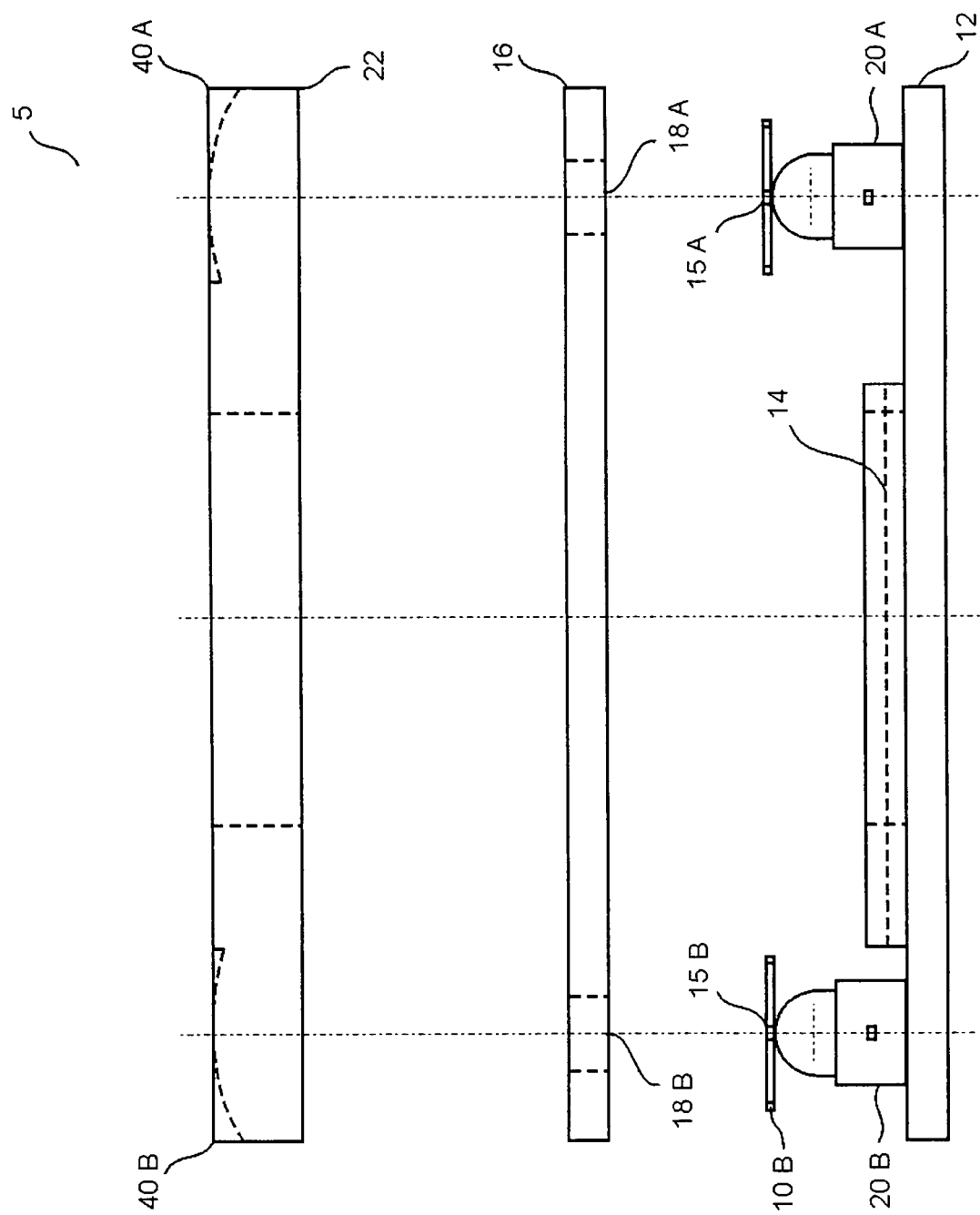

TARGETING SYSTEM FOR A PORTABLE IMAGE READER

This patent application is a continuation of U.S. patent application Ser. No. 11/033,093 filed Jan. 10, 2005 now U.S. Pat. No. 7,163,150.

FIELD OF INVENTION

The present invention relates to the field of portable image capture devices, and more specifically, to a targeting system for a portable image reader.

BACKGROUND OF THE INVENTION

Image reading devices of the type that allow optimal imaging distances, include a targeting scheme of some kind useful solely in aligning the image reader to the target, to obtain an optimal imaging distance from the target. Most of these techniques project a pattern onto the target from a targeting LED or laser diode. An aperture and IR light shaping optics are often used to project a pattern onto the target as an aid to the human operator to correctly position the image reader based on the targeting pattern.

The operator moves the image reader until targeting lines or dots converge at a predefined point, which relates to the point at which an acceptable image can be acquired. An acceptable image may be defined as one that contains sufficient resolution for post-processing. With this method, if the initial operating position is not correct it may be difficult for the operator to determine which direction the device must be moved in order to get into range. Further, with this method, the operator will perceive they can only capture an image at the predetermined distance at which the lines or dots converge, even though an acceptable image could potentially be acquired some distance before or beyond that point.

U.S. Pat. No. 6,385,352, which issued to Roustaei on May $7^{th}$ 2002, details a technique whereby a cylindrical lens is positioned over the targeting LED's to project a vertical line to frame the target. This technique however does not disclose apparatus for shaping the light emitted from the targeting LED's or for compensating for the resulting growth caused by the magnification of the line as the image reader is moved too close, or the shrinking of the line as it is moved away.

U.S. patent application Publication 2003/0019934, which was filed by Hunter on Mar. $7^{th}$ 2002 and published on Jan. $30^{th}$ 2003, discloses a method using an aperture positioned over the targeting LED's to project a line pattern onto the target. These lines however, are projected laterally (horizontally) and do not bound the target. With this technique, it would be difficult to intuit the direction to move the image reader, as the patterns simply form a line across the target. In an imaging solution, this technique is particularly unsuitable, as the human operator would have difficulty in aligning the centre of the target with the line pattern.

Therefore there is a need for a targeting system, which provides an operator with intuitive information on which direction to move the portable image capturing device in order to achieve a successful decode. It would also be desirable for the targeting system to provide this intuitive information within the parameters of the entire imaging range of the device.

SUMMARY OF THE INVENTION

The present invention is directed to an image reader comprising a circuit board, an image sensor mounted on the circuit board and an objective lens assembly having an objective lens axis positioned in front of the image sensor and adapted to direct light from a target to the image sensor. The image reader further includes a targeting system adapted to project a predetermined pattern having two or more components onto the target whereby the components maintain a uniform distance between one another to bound the target and whereby components vary in size as a function of the distance between the image reader and the target.

In accordance with another aspect of this invention, the pattern components may be one or two pairs of substantially parallel lines, where the lines vary in length as a function of the distance between the reader and the target.

In accordance with a further aspect of the invention, the targeting system may comprise a first optical apparatus located adjacent to one side of the objective lens assembly and adapted to project one line onto the target and a second optical apparatus located adjacent to substantially the opposite side of the objective lens assembly adapted to project another line onto the target.

In accordance with yet another aspect of this invention, the targeting system may comprise a first and a second optical apparati located in a first plane adjacent to opposite sides of the objective lens assembly and adapted to project two substantially parallel lines onto the target, and a third and a fourth optical apparati located in a second plane perpendicular to the first plane adjacent to opposite sides of the objective lens assembly and adapted to project two substantially parallel lines onto the target substantially perpendicular to the first and second optical apparatus parallel lines.

In accordance with a specific aspect of this invention, each of the optical apparati includes a targeting illumination source, an aperture having an elongated slit positioned in front of the illumination source and a cylindrical lens positioned in a corresponding orientation in front of the aperture. The targeting illumination may be a light emitting diode.

In accordance with a further specific aspect of the invention, the elongated slits in the first and the second optical apparati are substantially perpendicular to a plane through the first and second optical apparati, and the elongated slits in the third and the fourth optical apparati are substantially perpendicular to a plane through the third and fourth optical apparati.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein:

FIG. 1C is an exploded top view of the image reader module in FIG. 1A;

DETAILED DESCRIPTION

For purposes of explanation, specific embodiments are set forth to provide a thorough understanding of the present invention. However, it will be understood by one skilled in the art, from reading this disclosure, that the invention may be practiced without these specific details. Moreover, well-known elements, devices, process steps and the like are not set forth in detail in order to avoid obscuring the scope of the invention described.

A portable image reader comprises an image sensor, which could be linear or an array. Typically the sensor would be a CCD or CMOS image sensor, however other image sensors could also be used with the present invention. A typical reader further includes an objective lens mounted over the image sensor at a fixed distance to provide a specific focal length, an illumination source to illuminate a target to be imaged, a targeting light source and light shaping optics to direct a targeting pattern onto the target. The targeting pattern allows a human operator to align the image reader with the target.

In the targeting system in accordance with the present invention, a predetermined pattern having two or more components is projected onto the target such that the components maintain a uniform distance from one another to bound the target and at the same time components vary in size as a function of their distance between the image reader and the target. In one embodiment, the components are straight parallel lines and, when projected on the target, the ends of the lines form the corners of a substantially square shape, at which time, the operator knows that image acquisition may be successfully obtained.

The embodiments of the present invention will now be described in detail with reference to the drawings.

Figure 1A:
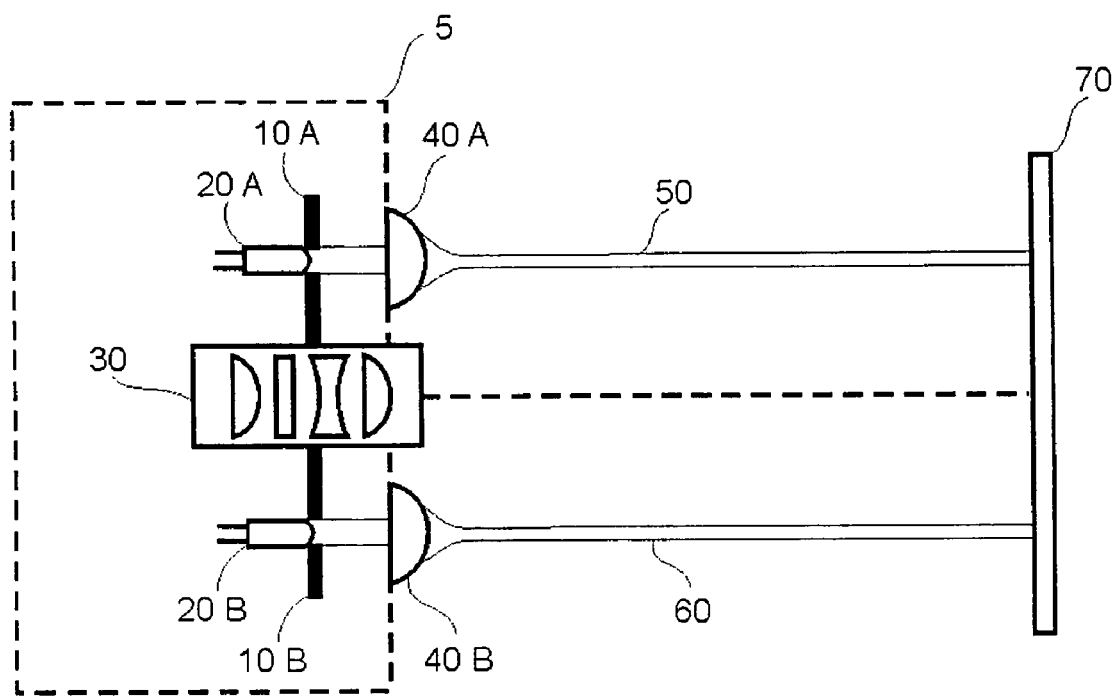
FIG. 1A is a top view of an image reader module in cross-section according to the present invention.
Figure 1B:
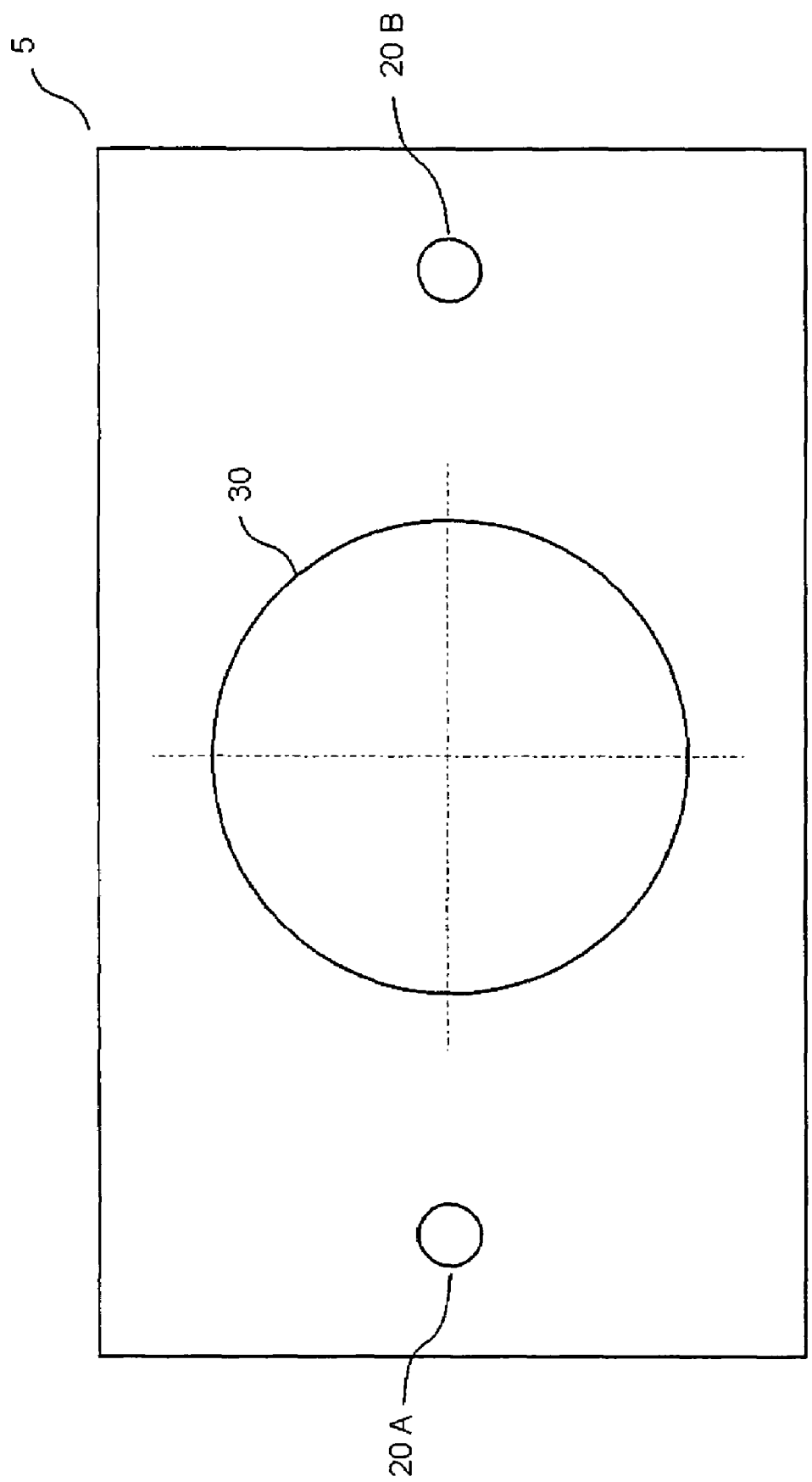
FIG. 1B is a front view of the image reader module in FIG. 1A illustrating the positioning of the targeting LED's, according to the present invention.

The drawings of FIGS. 1A, 1B, 1C and 1D show an embodiment of the image reader module 5 in accordance with the present invention. Targeting LED's 20A and 20B, are positioned adjacent to and on opposite sides of the object lens barrel 30 as illustrated in FIG. 1B, which shows the positioning of the targeting LED's 20A and 20B in relation to the objective lens 30. In order to project the desired light pattern onto a target, apertures 10A and 10B are positioned in front of the targeting LED's 20A and 20B, and cylindrical lenses 40A and 40B are positioned in front of the apertures 10A and 10B. The apertures 10A and 10B shape the light emitted from the targeting LED's into substantially rectangular vertical lines 50 and 60, which have a substantially constant width as seen in FIG. 1A. The cylindrical lenses 40A and 40B transmit these vertical line patterns 50 and 60 onto the imaging target 70.

It should be noted by those skilled in the art that more than one aperture may be used without departing from the scope of the invention. Additional apertures may be added between apertures 10A and 10B and the cylindrical lenses 40A and 40B. These additional apertures would be aligned with apertures 40A and 40B and may be used to further shape the emitted light from the targeting LED's 20A and 20B.

Figure 3A:
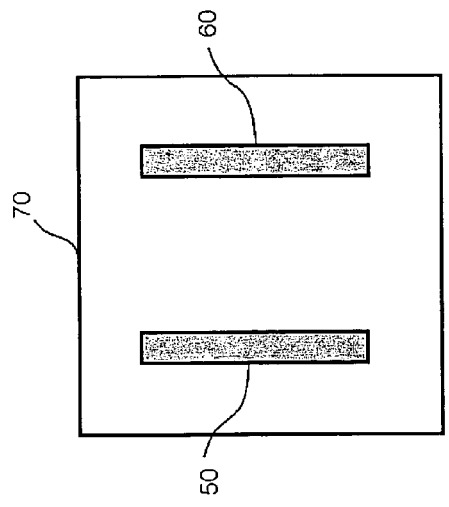
FIG. 3A through 3D illustrate a targeting pattern projected by the target system of the present invention at various module to target distances.
Figure 3B:
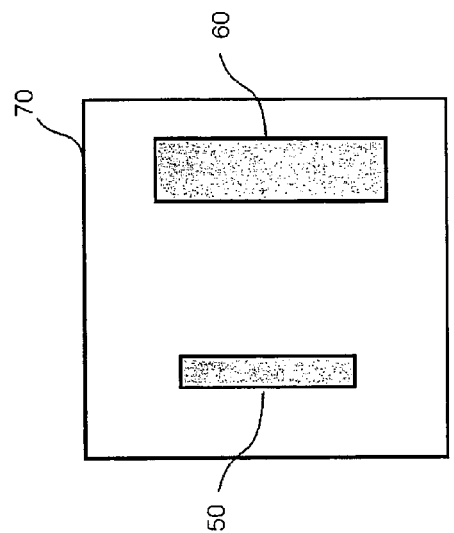
Figure 3C:
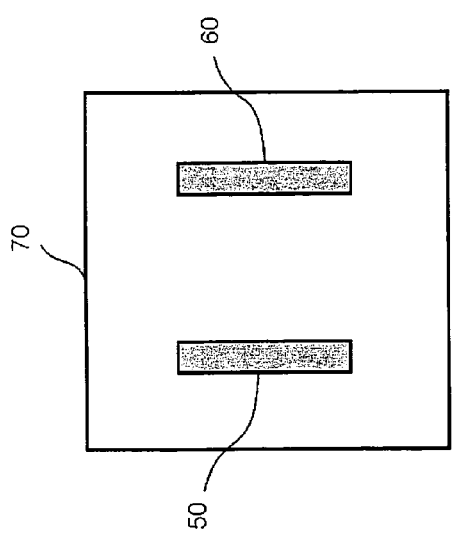

Components of the image reader module 5 are shown in FIG. 3C, these include a circuit board 12 on which is mounted an image sensor array 14, LED's 20A, 20B and apertures 10A, 10B. An illumination board 16 is configured with openings 18A and 18B over each LED 20A, 20B, aperture 10A, 10B combination. These openings 18A and 18B may be configured as slit apertures to further shape the emitted light or they may simply allow the light to pass unobstructed to the cylindrical lenses 40A and 40B. It should however, be noted by those skilled in the art that this is one possible configuration of an image reader module and other configurations, having more or less boards and/or panels are possible without departing from the scope of the invention.

Figure 1D:
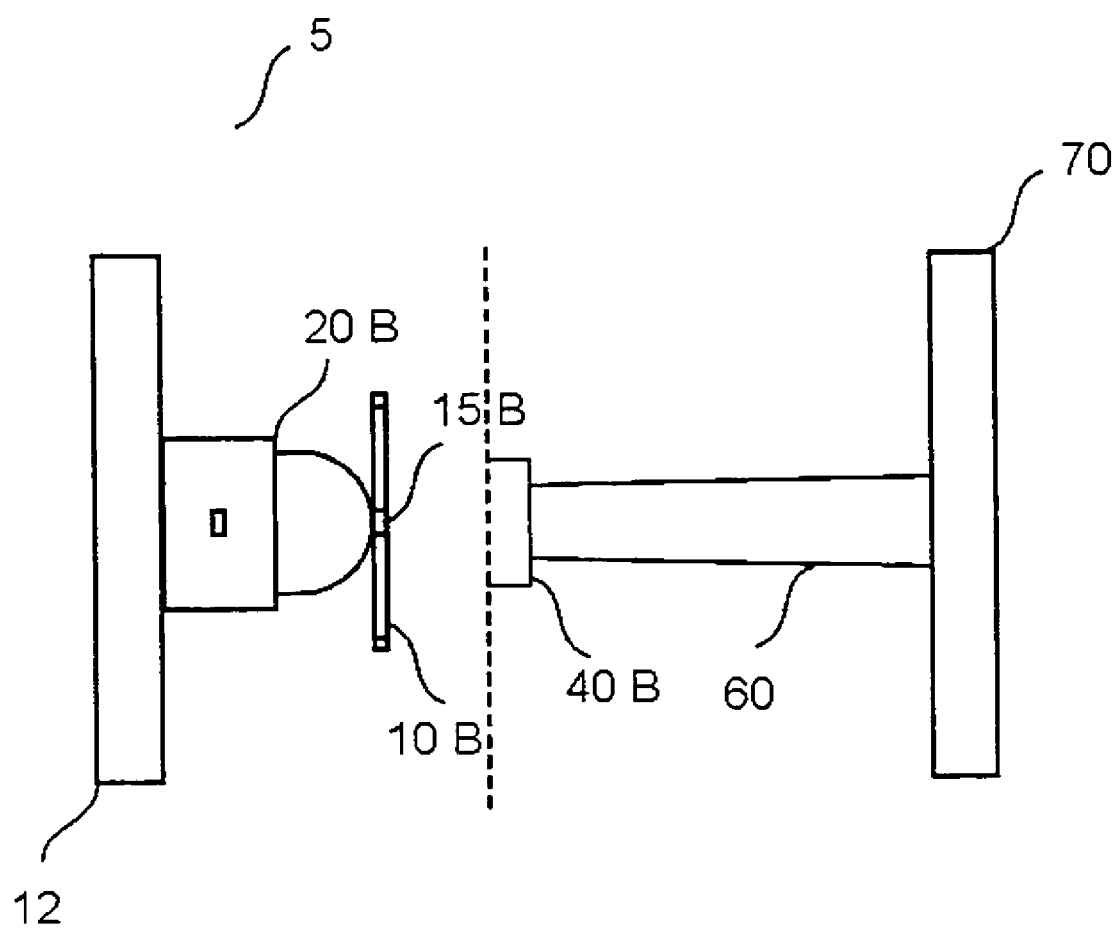
FIG. 1D is a side view of the image reader module illustrated in FIG. 1C.

With reference to FIG. 1D, the shaped light emitted from the targeting LED 20B forms a long, but narrow line on the target 70. This side view of the image reader 5 shows how the light pattern or line 60 increases in length slightly in the vertical direction as the module is moved away from the target 70. The relevance of this variation in length will be explained in further detail below.

Figure 2:
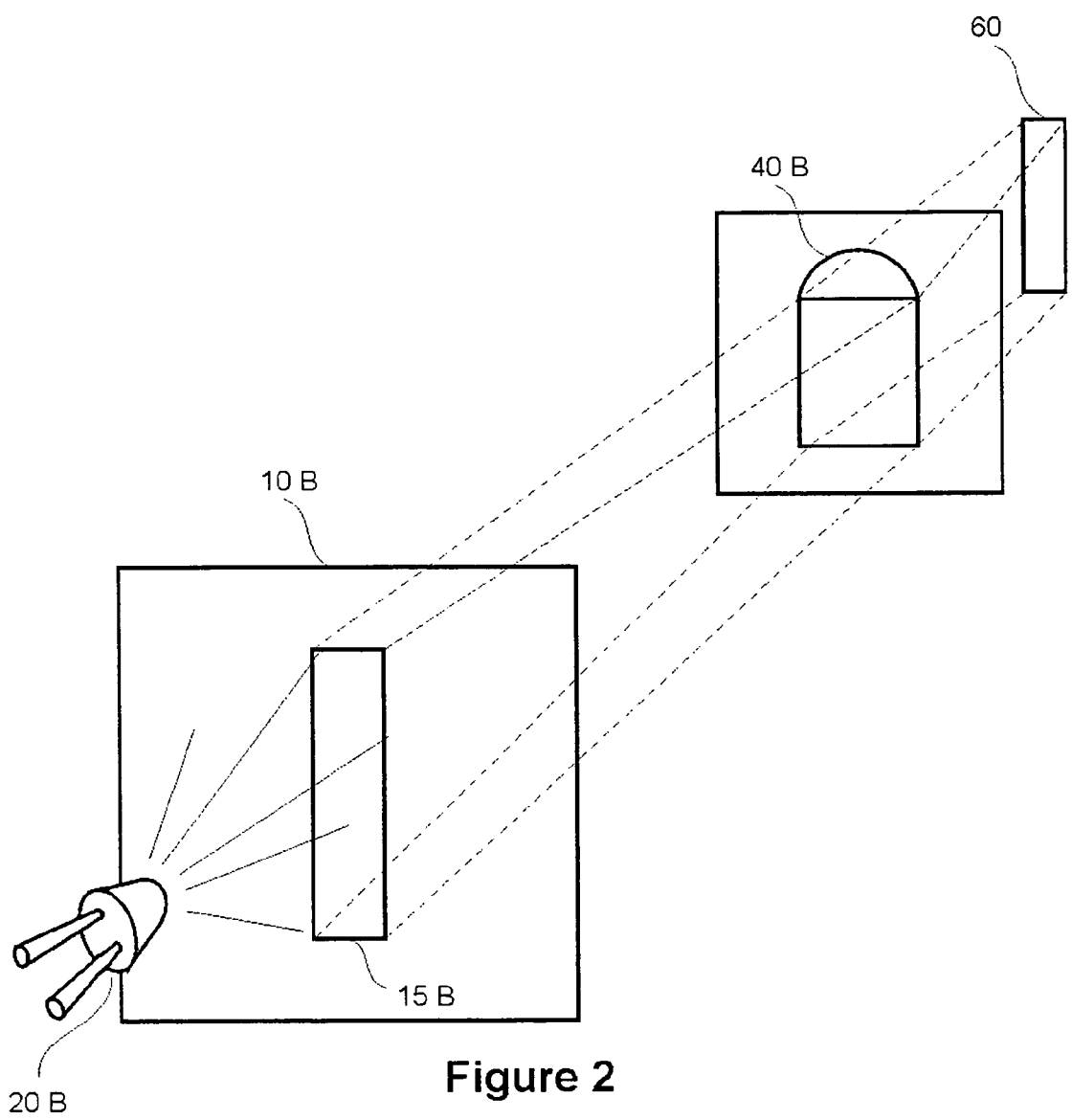
FIG. 2 is an exploded view representation of the cylindrical lens and slit aperture according to an embodiment of the present invention.

The aperture of the preferred embodiment is a slit aperture 10B. In the exploded view of FIG. 2, the light from the targeting LED 20B passes through the slit aperture 10B to a cylindrical lens 40B. The cylindrical lens 40B is positioned over the aperture 10B in a corresponding vertical orientation. The substantially rectangular shaped aperture opening 15B shapes the light emitted from the targeting LED 20B. Referring again to FIGS. 1A, and 1D, the resulting pattern of at least two vertical lines 50 and 60, are projected onto the target area 70. Due to the positioning and vertical orientation of the cylindrical lenses 40A and 40B over the vertical apertures 10A and 10B, the projected lines 50 and 60, as they appear on the target, remain at a substantially constant distance apart from one another regardless of the distance of the module from the target. For example, the distance may be 10-20 mm for bar code symbology readers or may be set for what best suits the user's requirements. However, as discussed above, as the module is moved away or towards the target, the lines become longer or shorter. The lengths of the vertical lines 50 and 60 are dependent on the device proximity to the target. A human operator can easily align the image reader 5 such that the ends of the two vertical lines 50 and 60 form the corners of a square shape at or near the centre of the target 70. At the optimal imaging distance, the lines are of substantially equal length and of the same length as the distance between them.

FIG. 3A shows the resulting pattern when the image reader 5 is too close to the target 70 to obtain a successful image acquisition. The lines 50 and 60 appear to be shorter than the distance between them. The operator would intuitively realize that the image reader 5 is too close to the target and will move it away from the target 70 resulting in a lengthening of the lines 50 and 60.

FIG. 3C shows the resulting line patterns 50 and 60 when the image reader 5 is past an optimal distance to obtain a successful image acquisition. The vertical lines 50 and 60 appear longer than the distance between them. The operator would intuitively realize that the image reader 5 is too far from the target 70 and will move the device closer to the target 70 resulting in a shortening of the lines 50 and 60.

Figure 3D:
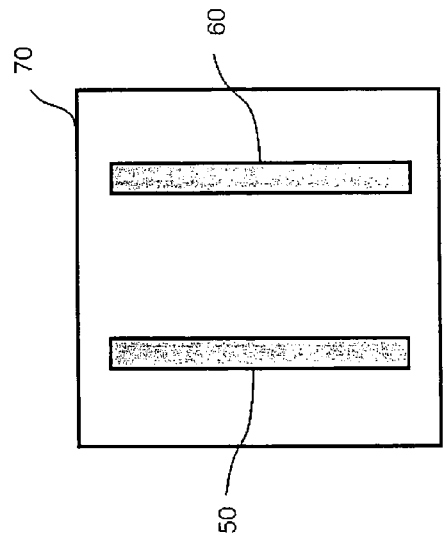

With reference to FIG. 3D, if the image reader 5 is aligned laterally at a substantially less than perpendicular angle in relation to the target 70, the vertical lines 50 and 60 will be such that one line appears thicker and longer than the other line. The human operator will know that they must change the angle of the image reader 5.

FIG. 3B represents the line patterns 50 and 60 resulting when an optimal distance, device to target, is achieved. It is not necessary for the line patterns 50 and 60 to line up perfectly with the centre of the target 70 or for the line patterns to be exactly the same length as the distance between them, in order to obtain a successful image acquire. It is only necessary for the pattern to be projected onto the target 70 and for the pattern to form a substantially square shape. In this way, a range of optimal targeting distances is possible. It is to be noted that the distance between the parallel lines 50, 60 is the same in all of the FIGS. 3A to 3C regardless of the distance between the reader and the target.

While this invention has so far been described with reference to vertical line patterns, it should be noted by a person skilled in the art that at least two horizontal lines, spaced a constant length apart, but magnified in the horizontal direction, could also be used in place of the vertical line patterns of the above described embodiment without departing from the scope of the invention. In this case, the targeting LED's would be position adjacent to, above and below the objective lens assembly with corresponding apertures and cylindrical lenses positioned on a horizontal plane. Essentially, what is required in accordance with the present invention is an apparatus that forms a square pattern at or near the centre of the target, either vertically or horizontally, in order to provide interpretive information to the human operator as to which direction to move the image reader.

Figure 4:
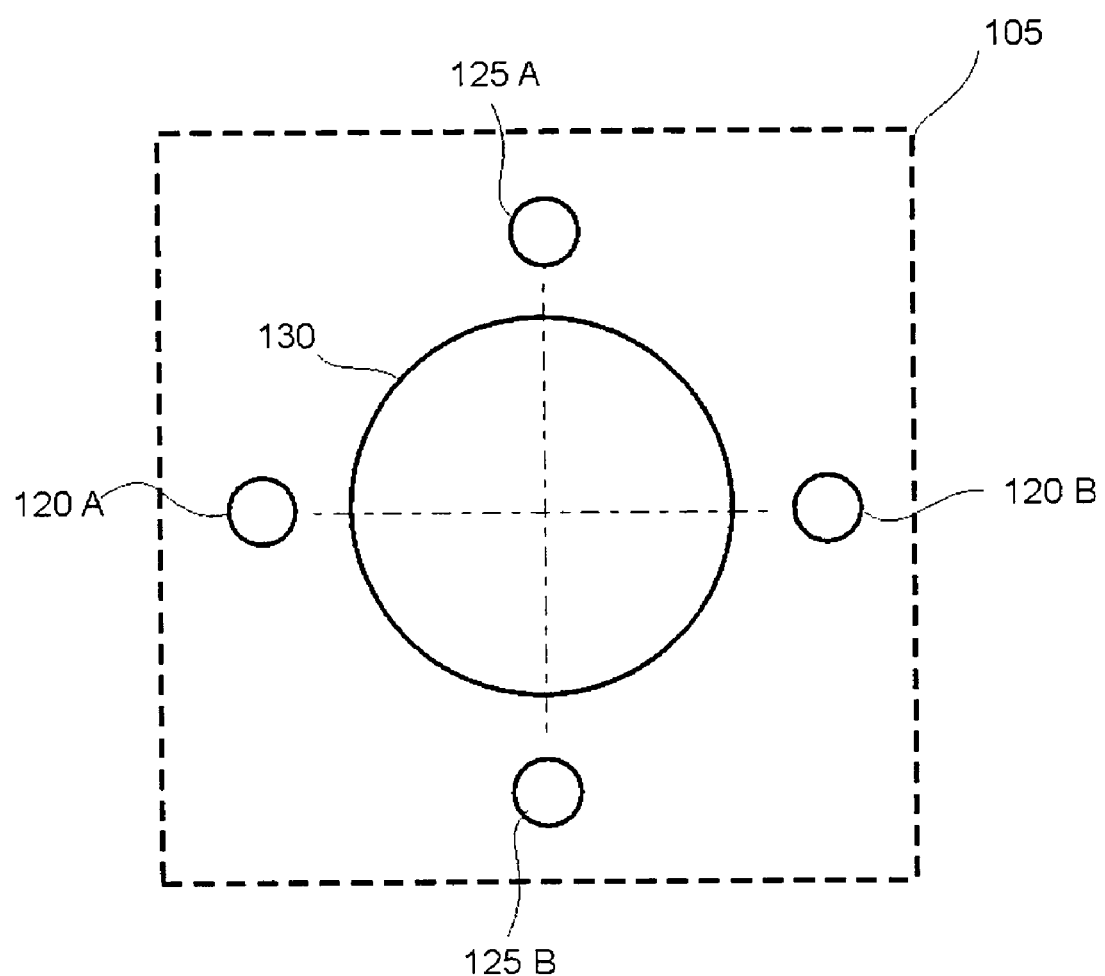
FIG. 4 is a front view of an image reader module according to another embodiment of the present invention including first and second targeting LED's.

The diagram of FIG. 4 shows another embodiment of the present invention. An image reader module 105 includes first targeting LED's 120A and 120B positioned adjacent to and on both sides of the objective lens 130 and second targeting LED's 125A and 125B positioned adjacent to, above and below the objective lens 130. With this arrangement, the targeting LED's form a substantially square pattern around the objective lens 130. Vertically oriented apertures are positioned over the first LED's 120A and 120B and horizontally oriented apertures are positioned over the second LED's 125A and 125B. Cylindrical lenses are positioned over each of the apertures in a corresponding orientation.

Figure 5A:
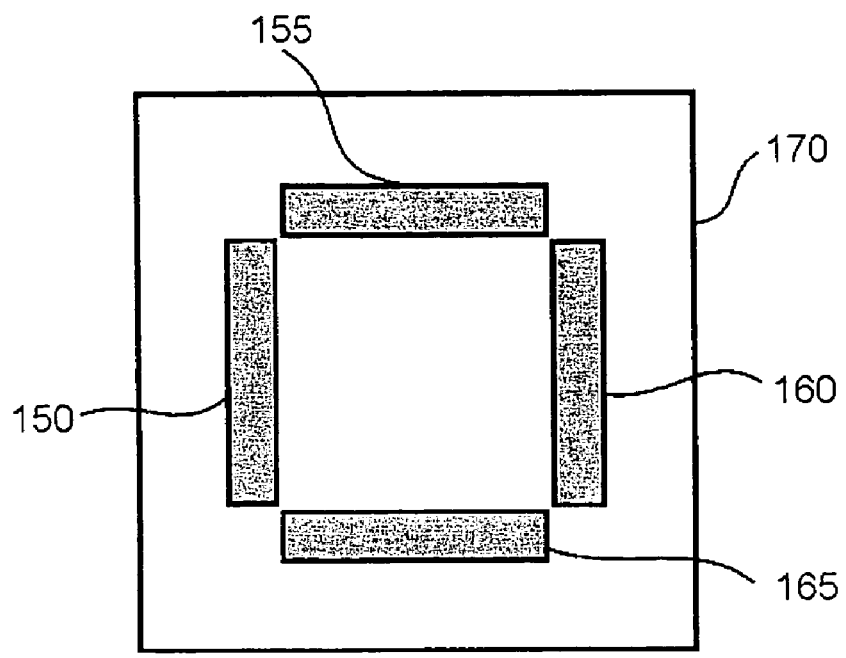
FIG. 5A illustrates a targeting pattern projected by the target system according to the embodiment illustrated in FIG. 4.

With reference to FIG. 5A it can be seen that with this embodiment, four line patterns 150, 155, 160 and 165 are projected onto the target 170, forming a square box shape on the target 170. The vertical lines 150, 160 maintain a uniform distance apart but vary in length in the vertical direction as the reader 105 is moved towards or away from the target 170. Similarly, due to the positioning and horizontal orientation of the cylindrical lenses 140 over the horizontal apertures, the horizontally projected lines 155, 165 also remain at a constant width apart and vary in length in the horizontal direction as the reader 105 is moved towards or away from the target 170. The length of the lines 150, 155, 160, 165 are dependent on the image reader 105 proximity and angle to the target 170.

Figure 5B:
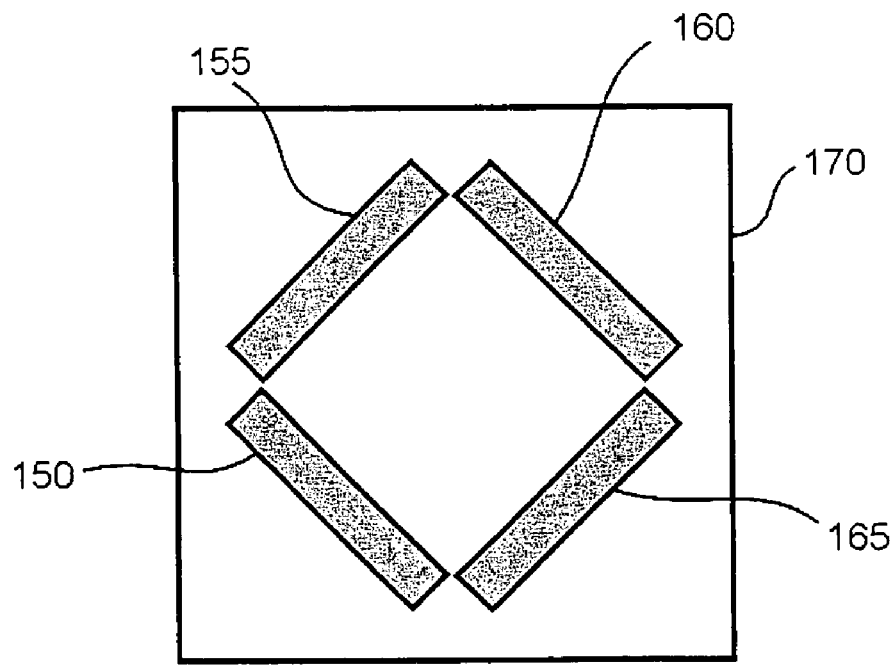
FIG. 5B illustrates a misaligned targeting pattern projected by the target system according to the embodiment illustrated in FIG. 4.

FIG. 5B shows the resulting vertical and horizontal line patterns 150, 155, 160 and 165, when the image reader 105 is at an optimal distance from the target 170, but is rotated counter clockwise about the objective lens axis causing the target 170 to not be optimally located relative to the center of the field of view of the image reader 105. The lines 150, 155, 160 and 165 are evenly spaced, but the pattern forms a rotated box shape on the target 170. Again the human operator would intuitively know which direction to move the image reader 105 in order to align the pattern lines 150, 155, 160 and 165 with the target 170.

By using at least two vertical or two horizontal line patterns or a combination of horizontal and vertical line patterns, an operator can determine not only the optimal imaging range, but also if the device is being held at an acceptable angle in relation to the target.

This targeting system allows a human operator to quickly position a portable imaging device, such as a barcode reader, over a target. The range over which an acceptable image can be acquired with a standard image reader is approximately 15 to 20 cm. Since the targeting pattern of the present invention forms a square shaped pattern when an operator moves the image reader to within an optimal range, and does not require that the operator align dots or line patterns to converge at a specific distance from the target, the present invention advantageously permits the operator greater latitude to move the image reader to any point within this range of distances, and still obtain an acceptable image of the target. Once the operator finds a pattern shape that works well under difficult circumstances, they can quickly and intuitively adjust the scanner to produce the known pattern shape.

This technique is insensitive to absolute measurement. The operator simply looks for relative size changes. The targeting pattern of the present invention forms a substantially square shape in order to obtain a successful image acquisition. Aspect ratio of the viewed pattern intuitively tells the operator what direction he must move the reader to better position it at the optimal working distance from the target. In the second embodiment of the present invention, this feedback comes from the spacing at the corners of the targeting pattern where the length of the pattern bars is equal to the distance between the bars.

From the above it is evident that the present invention has numerous advantages. The present invention provides a targeting system in an image reader that provides an operator with intuitive information to aim and align the image reader relative to the target, in order to achieve a successful decode. The intuitive targeting system may operate within the parameters of the entire imaging range of the image reader, that is, the entire range of distances in which a successful decode is possible and the targeting system may identify the center of the field of view. Further, the targeting system may be constructed at low cost with only slight modifications to existing image reader construction techniques.

It should be noted by a person skilled in the art that this invention is not limited to a use with LED's. Other types of light sources, including light sources with different wavelengths, may be used without departing from the scope of the invention. It should also be noted that while this invention has been described using substantially square shaped targeting patterns, different shapes and combinations of patterns might also be used without departing from the scope of the invention.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A system for image sensing comprising:
   a targeting system for projecting one or more groups of pattern components onto a target, the targeting system being positioned relative to an objective lens assembly for directing light from the target to an image sensor, the target system including, for each of the one or more groups of pattern components:
      a plurality of targeting illumination sources for the pattern components, respectively; and
      a light shaping device for shaping lights from the plurality of the targeting illumination sources so that the pattern components in the group maintain a substantially uniform distance between one another to bound the target.

2. A system as claimed in claim 1, wherein the light shaping device shapes the lights so that the pattern components vary in size as a function of the distance between the targeting system and the target.

3. A system as claimed in claim 2, wherein each of the pattern components comprises a quadrilateral cross section in a direction parallel to a plane through the corresponding plurality of targeting illumination sources, and wherein the light shaping device shapes each of the lights so that the size of the cross section of each of the pattern components is variable.

4. A system as claimed in claim 3, wherein the light shaping device shapes each of the lights so that the cross section of each of the pattern components varies in length or width as a function of the distance between the targeting system and the target.

5. A system as claimed in claim 2, wherein the light shaping device shapes the lights so that the distance between the pattern components remains substantially constant.

6. A system as claimed in claim 1, wherein the light shaping device comprises:
   a plurality of apertures for the plurality of targeting illumination sources, respectively, each of the plurality of apertures having a slit for shaping the light from the corresponding targeting illumination source; and
   a plurality of cylindrical lenses for the plurality of apertures, respectively, each of the plurality of cylindrical lenses being positioned in a corresponding orientation in front of the corresponding aperture.

7. A system as claimed in claim 6, wherein the slit is elongated substantially perpendicular to a plane through the corresponding plurality of targeting illumination sources.

8. A system as claimed in claim 6, wherein the light shaping device comprises an illumination board with a plurality of openings located between the plurality of apertures and the plurality of cylindrical lenses.

9. A system as claimed in claim 2, wherein each of the one or more groups of pattern components comprises a pair of substantially parallel lines.

10. A system as claimed in claim 9, wherein each of the parallel lines comprises a quadrilateral cross section in a direction parallel to a plane through the corresponding plurality of targeting illumination sources, and wherein the light shaping device shapes each of the lights so that the cross section of each of the corresponding parallel lines varies in size as a function of the distance between the targeting system and the target.

11. A system as claimed in claim 10, wherein the light shaping device shapes each of the lights so that the cross section of each of the corresponding parallel lines varies in length or width as a function of the distance between the targeting system and the target.

12. A system as claimed in claim 9, wherein the light shaping device shapes each of the lights so that the distance between the corresponding parallel lines remains substantially constant.

13. A system as claimed in claim 9, wherein for the pair of parallel lines, the corresponding targeting illumination sources comprise a first targeting illumination source and a second targeting illumination source, and
   wherein the light shaping device comprises, for the pair of parallel lines,
      a first aperture having a slit for shaping the light from the corresponding first targeting illumination source into one of the parallel lines;
      a second aperture having a slit for shaping the light from the corresponding second targeting illumination source into the other parallel line;
      a first cylindrical lens for the first aperture, the first cylindrical lens being positioned in a corresponding orientation in front of the first aperture; and
      a second cylindrical lens for the second aperture, the second cylindrical lens being positioned in a corresponding orientation in front of the second aperture.

14. A system as claimed in claim 13, wherein the slit is elongated substantially perpendicular to a plane through the corresponding first and second targeting illumination sources.

15. A system as claimed in claim 13, wherein the slits of the first and second apertures for one pair of parallel lines are substantially perpendicular to the slits of the first and second apertures for another pair of parallel lines.

16. A system as claimed in claim 13, further comprising an illumination board with a plurality of openings located between the first and second apertures and the first and second cylindrical lenses for at least one pair of parallel lines.

17. A system as claimed in claim 1, wherein the plurality of targeting illumination sources are located adjacent to sides of the objective lens assembly.

18. A system as claimed in claim 1, wherein the targeting illumination source is a light emitting diode.

19. A system as claimed in claim 1, further comprising an illumination assembly for illuminating the target.

20. A system as claimed in claim 1, wherein the position of the targeting system is adjustable over the target such that the pattern components bound the target.

* * * * *